United States Patent
Hurtta

(10) Patent No.: US 7,330,711 B2
(45) Date of Patent: Feb. 12, 2008

(54) METHOD FOR AVOIDING DOUBLE CHARGING OF A SERVICE IN A TELECOMMUNICATION SYSTEM

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 92 days.

(21) Appl. No.: 10/534,256

(22) PCT Filed: Nov. 12, 2002

(86) PCT No.: PCT/FI02/00893

§ 371 (c)(1),
(2), (4) Date: May 10, 2005

(87) PCT Pub. No.: WO2004/045141

PCT Pub. Date: May 27, 2004

(65) Prior Publication Data

US 2006/0111077 A1    May 25, 2006

(51) Int. Cl.
*H04M 11/00* (2006.01)
*H04M 15/00* (2006.01)
*H04H 7/00* (2006.01)

(52) U.S. Cl. ............ 455/408; 455/405; 455/406; 455/407; 379/114

(58) Field of Classification Search ........... 379/114.03, 379/114.2, 114; 455/405–408; *H04M 11/00, H04M 15/00*
See application file for complete search history.

(56) References Cited

U.S. PATENT DOCUMENTS

| | | | |
|---|---|---|---|
| 6,307,924 B1 * | 10/2001 | Rosenberg | 379/115.01 |
| 6,345,182 B1 * | 2/2002 | Fabritius et al. | 455/408 |
| 6,356,627 B1 * | 3/2002 | Hayball et al. | 379/112.01 |
| 6,480,485 B1 * | 11/2002 | Kari et al. | 455/407 |
| 2001/0055291 A1 * | 12/2001 | Schweitzer | 370/337 |
| 2002/0068545 A1 * | 6/2002 | Oyama et al. | 455/406 |
| 2002/0127995 A1 * | 9/2002 | Faccinn et al. | 455/408 |
| 2002/0191597 A1 * | 12/2002 | Lundstrom | 370/356 |
| 2004/0152444 A1 * | 8/2004 | Lialiamou et al. | 455/406 |

FOREIGN PATENT DOCUMENTS

| | | |
|---|---|---|
| EP | 1 014 619 | 6/2000 |
| EP | 1 134 990 | 9/2001 |
| FI | WO 0191445 | * 11/2001 |
| WO | WO 01/91446 | 11/2001 |

OTHER PUBLICATIONS

Orlamuender et al, Handling Internet Traffic in Telecommunications Networks. ISS '97. World Telecommunications Congress. International Switching Symposium, Sep. 21-26, 1997, vol. 1, pp. 579-586. Conf Proc. Article.

* cited by examiner

*Primary Examiner*—Duc M. Nguyen
*Assistant Examiner*—Daniel Lai
(74) *Attorney, Agent, or Firm*—Squire, Sanders & Dempsey, LLP

(57) ABSTRACT

In a telecommunication system wherein both a first layer charging function and a second layer charging function are able to attend to the processing of the charging data of the first layer, there is a risk of the first twice. To ensure that a client is not unnecessarily charged twice for a first layer service, and to ensure that the first layer service will be charged for, the function controlling the second layer charging transmits, to the function controlling the first layer charging function, information (303) indicating whether the second layer charging function attends to the charging of both layers, and if so, double charging is prevented.

15 Claims, 2 Drawing Sheets

METHOD FOR AVOIDING DOUBLE CHARGING OF A SERVICE IN A TELECOMMUNICATION SYSTEM

FIELD OF THE INVENTION

The invention relates to charging in a telecommunication system, wherein a bearer layer charging function and an application layer charging function are able, either both or one of them, to attend to charging data of both layers. The invention relates particularly to charging an online chargeable subscription, such as a prepaid subscription, in a mobile system when the application layer charging function is also able to attend to the processing of bearer layer charging data. A mobile system refers generally to any telecommunication system enabling wireless communication when users move within the service area of the system. A typical mobile system is the public land mobile network (PLMN).

BACKGROUND OF THE INVENTION

The tendency in telecommunication systems is increasingly to an environment where an application system (known also as an application network) is built onto or connected to an existing telecommunication system (known as a bearer system or bearer network) and uses the existing telecommunication system as a service bearer between a service provider and a user. For example in what are known as third generation mobile systems, such as the UMTS (Universal Mobile Communications system), the existing telecommunication system provides a user with a wireless connection to external systems, such as the IMS (IP multimedia subsystem) and their services, such as IP telephony (IPT). IP telephony is a general term covering services from standard voice over IP (VoIP) to multimedia applications that use IP data, voice and video in IP telephony. In addition to IP telephony, said telecommunication system supports other applications, such as access to the Internet or an intranet. An IP call, in turn, refers to a call that uses an IP-based user data stream and signalling. User data may contain various components, such as voice, video image and data. In addition to calls, IP telephony may comprise call-like services that may be unidirectional, directed to a group (or groups) or broadcasts within a given area, for example.

A mobile system service gaining popularity is a prepaid subscription. In a prepaid subscription, calls are not charged for retroactively, but the account of the prepaid subscription is billed online during calls. A prepaid subscription can usually be used for chargeable calls as long as credits exit on the subscription account, i.e. the entire prepaid sum has not been used.

A prepaid subscription will also be offered to users of external systems in such a way that a user needs only one subscription, which both the bearer system and the application system use for charging. For example in online charging in the IP multimedia subsystem (IMS), both the bearer system and the IMS deliver their charging records to a charging system that attends to the online charging in the IMS and comprises a correlation function enabling the matching of the charging records delivered by the bearer system and the IMS to the right subscription and the same service.

The problem in the above arrangement is that when a connection is being set up, the bearer system does not know if a bearer service to be charged via the IMS is involved or a service that the bearer system has to charge for itself. To ensure that a subscription is charged for the use of a bearer system, the bearer network node collecting charging data should be given instructions to transmit charging records to the charging system of the bearer system. To ensure that a subscription is charged for the IMS service, the IMS node collecting charging data should be given instructions to transmit charging records to the charging system of the IMS. In that case there is a risk that the usage of the bearer system is charged twice, the other charging being included in the service charge of the IMS. To avoid double charging, all charging records should be gone through and overlapping charging records should be identified. This is slow and is not suited to online charging.

The same problem exists also in other applications of online charging, such as a postpaid subscription on credit control. It is a subscription that is charged afterwards and given a maximum amount to be billed, i.e. the maximum amount of the bill within a charging period.

BRIEF DESCRIPTION OF THE INVENTION

The object of the invention is to avoid double charging. The object of the invention is achieved by methods, systems and network nodes that are characterized by what is stated in the independent claims. The preferred embodiments of the invention are disclosed in the dependent claims.

The invention is based on observing the problem and solving it by transmitting to the function controlling the charging function of the first layer, information on whether the second layer charging function attends to the charging data of both layers, and if so, double charging is prevented. It is prevented either by transmitting, to the network nodes collecting charging data of the first layer, information stating that charging data are not required in the charging function of the first layer, cancelling the charging instruction transmitted to the network nodes collecting first layer charging data, according to which instruction the charging data are transmitted to the charging function of the first layer, ignoring at least partly the charging data received from the first layer in the first layer charging function or transmitting a new charging instruction to the first layer regarding the charging data to be transmitted to the charging function of the first layer.

Herein, the term charging refers to measures for collecting charging data on the use of services and measures for processing the charging data. Charging a user device refers to charging directed to an authorized user or the subscriber paying his bill. Charging may also comprise the actual billing of the payer.

Herein, the term charging data covers everything that may be used for charging or any information on the basis of which charging data may be deduced. It is irrelevant for the invention in which messages or in which form the charging data is transmitted.

An advantage of the invention is that the client is not unnecessarily charged twice for one service, but it is made sure that a service is charged for. A further advantage is that no charging record comparisons are required, enabling also online billing.

BRIEF DESCRIPTION OF THE FIGURES

In the following, the invention will be described in detail in connection with preferred embodiments with reference to the accompanying drawings, in which.

DETAILED DESCRIPTION OF THE INVENTION

The present invention is applicable to any telecommunication system wherein a subscriber is able to use only the services of a first layer or the services of a second layer via the first layer and wherein charging data of the first layer can be attended by the charging system of the first layer or the charging system of the second layer. The invention is also applicable if the charging data of the second layer can be attended, by not only the charging system of the second layer, but also by the charging system of the first layer. Such systems may be based on for instance what are called third generation mobile systems, such as the UMTS, and systems based on them, and on mobile systems corresponding to the GSM system, such as GSM 1800 and PCS (Personal Communication System), and systems based on said systems, such as GSM 2+ systems. The invention is also applicable to other wireless systems, fixed systems or systems having one fixed layer and a second layer based on wireless communication.

In the following, the invention will be described by using an exemplary system based on the 3GPP AII-IP system without restricting it thereto. The 3GPP AII-IP is a system based on the IP technology, utilizing the GPRS (General Packet Radio Service) and specified in the $3^{rd}$ generation partnership project 3GPP, online charging being arranged in the system by utilizing an intelligent network service implementation according to the CAMEL architecture (Customised Applications for Mobile network Enhanced Logic). The GPRS and CAMEL are GSM 2+ stage services. The specifications of telecommunication systems and particularly wireless telecommunication systems develop rapidly. Such development may require extra changes to the invention. Therefore, all words and expressions should be interpreted broadly and they are intended to illustrate, not restrict the invention. The function is essential to the invention, not the network node where the function is located.

Figure 1:
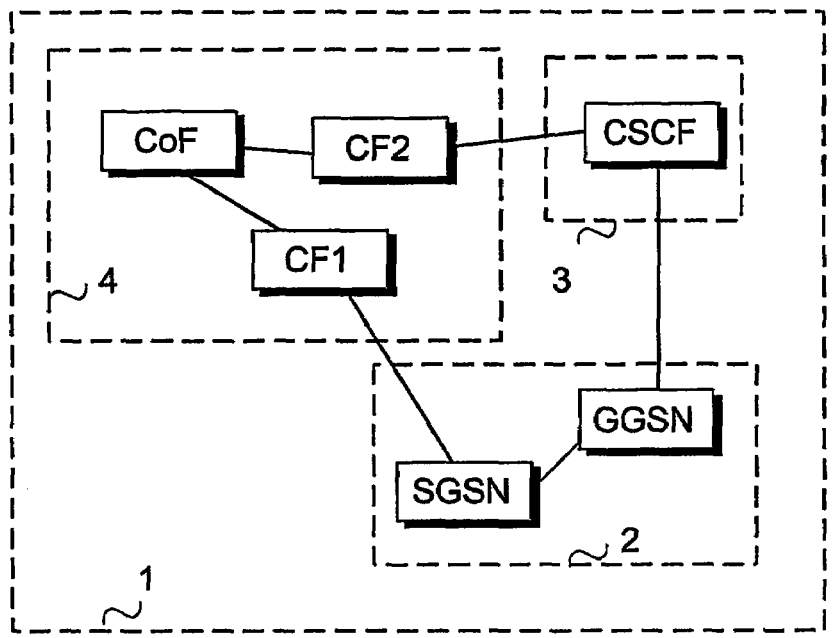
FIG. 1 is a simplified block diagram of the architecture of a system.

FIG. 1 shows simplified network architecture and only shows some elements of the architecture of a system. The network nodes shown in FIG. 1 are logical units whose implementation may differ from what is shown. It is apparent to a person skilled in the art that the system may also comprise other functions and structures that need not be described in detail herein.

The exemplary system 1 preferably comprises three logical domains: a packet switched domain 2 (PS domain) based on the GPRS, an IMS domain 3 and a billing domain 4. However, the structures of the different domains and the division of the domains have no significance to the invention.

The packet-switched domain 2 of the exemplary system is based on the general packet radio service GPRS. The packet-switched domain may be used only either as a bearer layer to the IMS application layer or as a bearer and application layer to GPRS applications. The packet-switched domain 2 comprises serving GPRS support nodes SGSN and gateway GPRS support nodes GGSN serving user equipments in its area.

Each serving support node SGSN provides mobile data terminals, i.e. user equipments, with packet data service within the area of one or more cells in its service area in a cellular type of packet radio network. Typically, the SGSN participates in collecting charging data of the PS domain. The SGSN also preferably comprises an intelligent network service switching function or a corresponding function for enabling online charging.

The gateway GPRS support nodes GGSN switch an operator's GPRS network to other GPRS networks and/or external systems, such as the IMS domain 3. A GGSN may also be switched directly to a private company network or host. A GGSN acts as a router between an external system and internal routing information (e.g. SGSN). A GGSN may participate in collecting charging data of the PS domain. The GGSN may have an interface with the billing domain 4, the interface corresponding preferably to an interface between the SGSN and the billing domain 4. The GGSN of the exemplary system also comprises charging identifier generation means for generating a charging identifier part required when correlating charging data produced in the PS domain and in the IMS domain.

In the exemplary system of FIG. 1, the IMS domain 3 comprises not only an actual IP network and various servers (now shown in the figure) but also one or more connection state control functions CSCF. The CSCF controls session set-ups, attends to routing and comprises, among other things, an intelligent network service switching function or a corresponding function for enabling online charging. The CSCF is the network node in which the user equipments of IP telephony register. The CSCF preferably attends to the achievement of charging data of a session in the IMS domain. Other functions belonging to the IMS domain or connected thereto may also collect charging data.

For online charging, the billing domain 4 comprises a correlation function CoF that controls charging, a charging function CF1 controlling charging of the packet-switched domain 2 and a charging function CF2 controlling charging of the IMS domain 3. Hereafter the term "charging function" will be used instead of the term "charging function controlling charging". The correlation function takes care of correlating charging data produced in the PS domain and in the IMS domain. For example in a prepaid service, the charging function controls and monitors the balance of the account. Control and monitoring could also be separated. It bears no significance to the invention where the above-mentioned functions are located in billing domain 4. They may all be located in different network nodes, in the same network node or two in the same network node and the last one in another network node. In the exemplary system where CAMEL is used, charging function CF1 is a service control function SCF. Charging could also be controlled by the service control function of another intelligent network protocol or by methods specified by open interfaces (OSA, Parlay). An online chargeable account/subscription may be used for charging all types of services, such as diverse charging events that are required in e-commerce, for example.

The charging function may comprise all service logic associated with online charging, the service logic of services utilizing online charging, control associated with a service and/or online charging, and databases required for online charging or access to the databases. The charging function is only a logical function and, internally, it may be implemented in different ways. An alternative is that it is internally decentralized and the service logic associated therewith may be distributed into different nodes. Service data may also be distributed into different nodes than the service logic. Further, the charging functions CF1 and CF2 may be internally implemented in different ways and they may comprise different things.

In the exemplary system of FIG. 1, the charging function CF2 of the IMS domain is arranged to indicate to the charging function CF1 of the packet-switched domain that the CF2 attends to charging data of both domains. The CF2 may indicate this either directly to the CF1 or via the CoF. In some other embodiment of the invention, the CoF is arranged to recognize the situation in which the CF2 attends to charging data of both domains in which case the CoF indicates the situation to the CF1, The function of the charging function CF1 of the packet-switched domain in different embodiments is described in detail in FIGS. 2, 3, 4 and 5.

The implementation of the charging functions and the correlation function and the manner in which and the place from which they obtain the necessary charging records are not significant to the invention. Other charging details, such as the manner how charging data are collected or where they are stored, are of no importance to the invention.

In order to transmit and receive GPRS data or IP telephony, the user equipment has to activate a packet data protocol (PDP) address it wants to use by requesting a PDP context activation. The PDP context specifies different data transmission parameters, such as PDP type (e.g. IPv4 or IPv6), PDP address (e.g. IPv4 or IPv6 address) and quality of service (QoS). The PDP context may also contain an access point name (APN). The QoS and/or the APN may be used as charging bases. Activating a PDP context makes user equipment known in the corresponding GGSN and cooperation with the different servers and/or networks through the packet-switched domain can begin. If a user wants to use IP telephony, the user equipment also has to register in the CSCF. Cooperation with the IMS system can then begin. IP telephony is visible to the support nodes SGSN and GGSN as only one PDP context, i.e. as bearers having negotiated service quality requirements.

If a user equipment comprises a subscription to be charged online, the SGSN encounters a subscription-specific trigger (detection point) during the activation of the PDP context, and as a result it requests at least charging instructions directly or indirectly from the charging function that controls the charging of the packet-switched domain. Similarly, when registering, the CSCF encounters a subscription-specific trigger (detection point), and as a result, it requests at least charging instructions directly or indirectly from the charging function that controls the charging of the IMS domain. As was stated previously, at least when the charging function of the IMS domain also attends to the charging of the packet-switched domain, either said charging function or the correlation function, in turn, is arranged to inform this to the charging function controlling the charging of the packet-switched domain. Always after receiving a charging instruction request, the correlation function or the charging function of the IMS domain can also be arranged to inform the charging function controlling the charging of the packet-switched domain whether or not the charging function CF2 of the IMS domain attends to charging data of the packet-switched domain.

FIGS. 2, 3, 4 and 5 show the operation of a charging function of a packet-switched domain according to the invention. Hereinafter, the charging function of the packet-switched domain will be called PS charging function. FIGS. 2, 3, 4 and 5 show prior art operation only to a degree necessary to understand the invention. Checks related to online charging, for example, are not described. The assumption in the figures is also that the use of the service is allowed, for instance a prepaid balance still exists. In addition, for the sake of clarity, a further assumption is that the charging function of the IMS domain and later called IMS charging function, transmits data related to charging to the PS charging function only if the charging function CF2 of the IMS domain also attends to charging data of the packet-switched domain.

Figure 2:
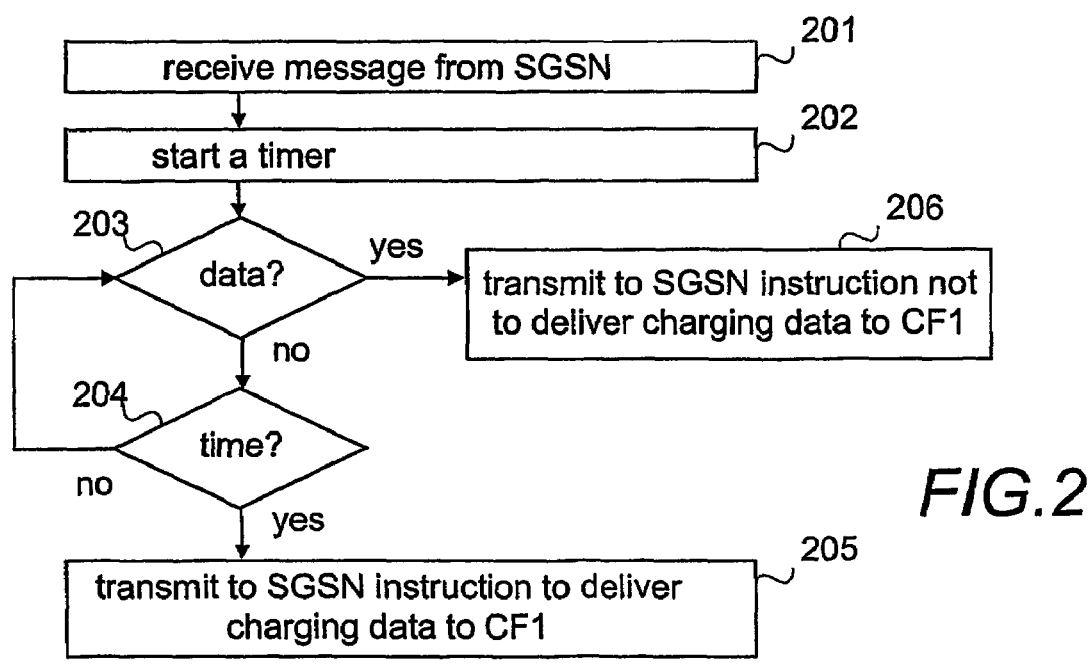
FIG. 2 is a flow diagram illustrating the operation according to a first embodiment of the invention.

FIG. 2 shows a PS charging function according to a first preferred embodiment of the invention. In step 201, the PS charging function receives a message triggering online charging from the SGSN and, in step 202, a timer is started. The timer may be started on the APN and/or QoS basis, for example.

The PS charging function then waits for a predetermined time, defined by the timer, for information from the IMS charging function regarding whether or not the charging data of the GPRS, i.e. of the bearer network is also attend to by the IMS system. If no information is received (step 203), and the predetermined time has lapsed, i.e. the timer expires, (step 204), in step 205 a normal charging instruction associated with online charging of the GPRS system is sent to the SGSN, for instance "Apply Charging GPRS", on the basis of which the SGSN sends charging records to the PS charging function CF1.

If the information is received (step 203) before the predetermined time has lapsed, in step 206 information is sent to the SGSN as a charging instruction, stating that charging data do not have to be sent to the PS charging function CF1. This charging instruction can be sent in a message indicating the charging instruction indirectly, such as "Continue GPRS", for example. In other words, if the message does not include a separate charging instruction, it is interpreted as a charging instruction according to which charging data do not have to be sent. Alternatively an amended charging instruction, including a different charging instructions compared to one which would be sent in step 205, can be sent in step 206.

In another embodiment of the invention, the PS charging function is able to distinguish the subscriptions in which the IMS charging function may attend to the charging data of the packet switched domain from those subscriptions in which the IMS charging function may not attend to the charging data of the packet switched domain. As regards the latter subscriptions, in this embodiment, the PS charging function does not wait for possible information from the IMS charging function but proceeds according to prior art. In other words, in this embodiment, the PS charging function checks, after receiving the message triggering the online charging (step 201 in FIG. 2) from the SGSN, whether or not the subscription is one of those where the IMS charging function may also attend to the charging information, and if it is, continues from step 202 by starting the timer. If it is not, the PS charging function continues according to prior art.

Figure 3:
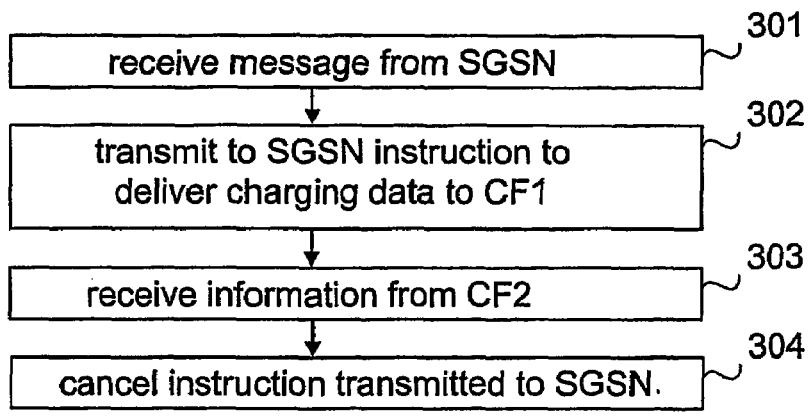
FIG. 3 is a flow diagram illustrating the operation according to a second embodiment of the invention.

FIG. 3 shows the PS charging function of a second preferred embodiment of the invention. In step 301, the PS charging function receives, from the SGSN, a message triggering online charging and, based on the message, in step 302 a normal charging instruction associated with online charging of the GPRS is sent to the SGSN, for instance "Apply Charging GPRS", on the basis of which the SGSN sends charging data to the PS charging function CF1. If in step 303 the PS charging function then receives, as is the assumption in the example of FIG. 3, information from the IMS charging function stating that the charging data of the GPRS, i.e. of the bearer network, is also attended to by the IMS charging function, the charging instruction sent in step 302 to the SGSN is cancelled in step 304 by sending for example "Cancel". As a result of the cancellation, the SGSN does not send charging records to the PS charging function CF1.

Figure 4:
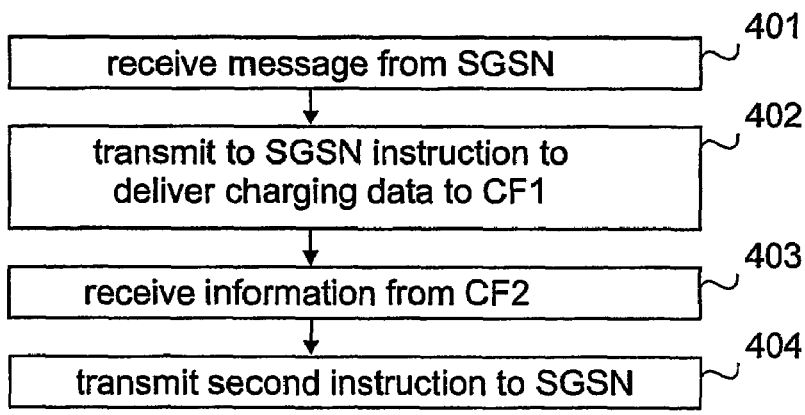
FIG. 4 is a flow diagram illustrating the operation according to a third embodiment of the invention.

FIG. 4 shows the PS charging function according to a third preferred embodiment of the invention. In step 401, the PS charging function receives, from the SGSN, a message triggering online charging and, based on the message, in step 402 a normal charging instruction associated with online charging of the GPRS is sent to the SGSN, for instance "Apply Charging GPRS", on the basis of which the SGSN sends charging data to the PS charging function CF1. If in step 403 the PS charging function then receives, as is the assumption in the example of FIG. 4, information from the IMS charging function stating that the charging data of the GPRS, i.e. of the bearer network, is also attended to by the IMS charging function, then in step 404, a second charging instruction is sent to the SGSN, which second charging instruction replaces the first charging instruction at the SGSN. For example, the second charging instruction may allow a longer time for a (real-time) PDP context to be active or a larger amount of octets to be transferred with the PDP context. Thus, in the above examples the payment per a time unit or per an octet is reduced.

In another preferred embodiment of the invention, the PS charging function cancels, e.g. by a "Cancel" message, the previous, i.e. the first charging instruction, before sending a new, i.e. second charging instruction. In other words, the message cancelling the first charging instruction is sent between steps 403 and 404.

The use of a second charging instruction enables a more versatile implementation of charging systems. For instance, the charging of the IMS system can use a constant rate for all bearer networks. If the rate of the bearer network exceeds the constant rate, the difference can be billed using the PS charging function of the bearer network.

Figure 5:
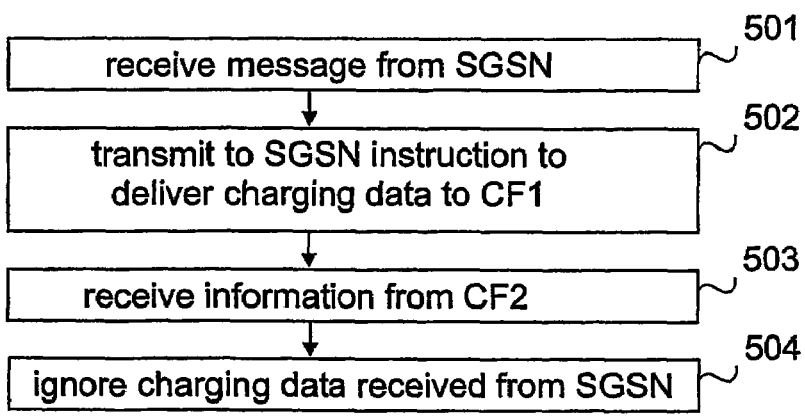
FIG. 5 is a flow diagram illustrating the operation according to a fourth embodiment of the invention.

FIG. 5 shows the PS charging function of a fourth preferred embodiment of the invention. In step 501, the PS charging function receives, from the SGSN, a message triggering online charging and, based on the message, in step 502 a normal charging instruction associated with online charging of the GPRS is sent to the SGSN, for instance "Apply Charging GPRS", on the basis of which the SGSN sends charging data to the PS charging function CF1. If in step 503 the PS charging function then receives, as is the assumption in the example of FIG. 5, information from the IMS charging function stating that the charging data of the GPRS, i.e. of the bearer network is also attended to by the IMS charging function, then in step 504 the PS charging function CF1 ignores the charging data of the bearer layer of this data transmission received from the SGSN.

In some other preferred embodiment of the invention the PS charging function may in step 504 attend to the charging data received from the SGSN as modified, partly or charge on the basis of them differently, for example reduce the account less. In other words, the PS charging function may ignore the charging data partly, which means that the charging data is not fully taken into account.

Above in FIG. 5 it is assumed that controlling means of the PS charging function controlling the charging and charging means of the PS charging function pertaining to actual charging are integrated in the same network node, wherein the instruction to at least partly ignore the charging data is internal information transfer between different means within the network node. If this is not the case, in step 504 the controlling means sends the instruction to a network node comprising the charging means which functions according to the instruction.

The steps presented above in FIGS. 2, 3, 4 and 5 are not in an absolute chronological order; some of them may be executed simultaneously or in an order different from the one presented. Other functions may also be executed between the steps and some functions may be omitted, such as steps 304, 404 and 504 in FIGS. 3, 4 and 5, if information related to the charging of the data transmission connection is not received from the IMS charging function during the data transmission connection in question. The steps may also be modified depending on which network nodes participate in collecting charging data. For example, messages having similar contents can be sent, not only to the SGSN but also to the GGSN when the GGSN also collects charging data. The GGSN may collect charging data of the bearer layer instead of the SGSN or with the SGSN. The GGSN may also collect charging data of the application layer or charging data of both layers. Correspondingly, the steps may be modified according to which network node charging data is transferred.

If in online charging the correlation function or the IMS charging function is arranged to always notify whether or not the IMS charging function also attends to packet-switched charging data, this is checked in response to information received from the IMS layer. In the above described embodiments, if the charging data of both layers are not attended to by the IMS charging function, the procedure is as if no information from IMS charging function or from the correlation function were received at all. Such a special situation may arise when a user has a subscription that is chargeable online at the GPRS, and has a subscription that is not chargeable online for IMS services at the IMS, i.e. a subscription without charging limit that is charged afterwards for IMS services. Such a situation may also arise if the user has a separate subscription at the GPRS that is charged online and a separate subscription intended only for online charging of IMS services.

Although the invention is described above with FIGS. 2 to 5 under the assumption that the IMS charging function sends information on whether or not it attends to the charging data of the PS domain, it is obvious for one skilled in the art how to implement the invention if the correlation function sends the information.

Although the invention was described above under the assumption that online charging is implemented as an intelligent network service, it is apparent to a person skilled in the art that the invention is also applicable to online charging implemented in other manners and to afterwards charging.

Although the invention was described above under the assumption that the application layer is able to attend to the charging data of the bearer layer, it is apparent to a person skilled in the art that the invention is also applicable when the bearer layer is able to attend also to the charging data of the application layer.

The system and its network nodes implementing the functionality of the present invention comprise, not only prior art means but also means for implementing the above-described separate functions or different combinations of these functions. Present network nodes and user equipments comprise processors and memory, which can be utilized in the functions of the invention. All changes required for implementing the invention can be achieved by configuring, i.e. by adding data transfer modules and/or routines to the devices and can be implemented by added or updated software routines, application circuits (ASIC) and/or programmable circuits.

It is obvious to a person skilled in the art that as technology advances, the basic idea of the invention can be implemented in a variety of ways. The invention and its embodiments are thus not limited to the above examples, but may vary within the claims.

The invention claimed is:

1. A method comprising:
    waiting by a first layer charging function, a predetermined time for a first piece of information indicating that a first layer charging data are attended to by a second layer charging function, the first piece of information not being part of the first layer charging data
    transmitting, in response to receiving the first piece of information during the predetermined time, to a network node collecting first layer charging data on the first layer information in a charging instruction indicating that charging data are not transmitted to the first layer charging function; and
    if the first piece of information is not received during the predetermined time, transmitting, to the network node collecting first layer charging data, information in a charging instruction indicating that charging data are transmitted to the first layer charging function,
    wherein the first layer and the second layer are usable for transmitting a service in a telecommunication system.

2. A method as claimed in claim 1, wherein the method is used for online charging.

3. A method as claimed in claim 1, wherein the first layer is a bearer layer and the second layer is an application layer.

4. A method as claimed in claim 1, wherein the first layer is an application layer and the second layer is a bearer layer.

5. A method comprising:
    transmitting from a first layer charging function information to a network node collecting charging data on a first layer in a first charging instruction, the information indicating that charging data are transmitted to the first layer charging function;
    receiving in the first layer charging function charging data from the network node collecting charging data on the first layer;
    receiving in the first layer charging function a first piece of information indicating that the first layer charging data are attended to by a second layer charging function, the first piece of information not being part of the first layer charging data; and
    ignoring, in response to the first piece of information, in the first layer charging function at least partly the charging data coming from network node collecting charging data on the first layer,
    wherein the first layer and the second layer are usable for transmitting a service in a telecommunication system.

6. A method as claimed in claim 5, wherein the method is used for online charging.

7. A method as claimed in claim 5, wherein the first layer is a bearer layer and the second layer is an application layer.

8. A method as claimed in claim 5, wherein the first layer is an application layer and the second layer is a bearer layer.

9. A telecommunication system, comprising:
    a first layer and a second layer, both of which are configured to transmit a service;
    at least one network node configured to collect charging data on the first layer; and
    a billing domain comprising at least a first layer charging function configured to control charging on the first layer and a second layer charging function configured to control charging on the second layer; the billing domain being configured to transmit, to the first layer charging function, a first piece of information indicating that the first layer charging data are attended to by the second layer charging function in response to the first layer charging data being attended to by the second layer charging function, the first piece of information not being part of the first layer charging data; wherein
    the first layer charging function is configured to wait a predetermined time for the first piece of information and, in response to receiving the first piece of information during the predetermined time, to transmit, to the network node, information in a first charging instruction indicating that the charging data are not transmitted to the first layer charging function; and, in response to not receiving the first piece of information during the predetermined time, to transmit, to the network node, information in a second charging instruction indicating that the charging data are transmitted to the first layer charging function; and
    the network node is configured not to transmit charging data to the first layer charging function in response to the first charging instruction; and the network node is configured to transmit charging data to the first layer charging function in response to the second charging instruction.

10. A telecommunication system as claimed in claim 9, wherein the second layer charging function is configured to send the first piece of information.

11. A telecommunication system as claimed in claim 9, wherein the billing domain further comprises a correlation function which is configured to send the first piece of information.

12. A telecommunication system, comprising:
    a first layer and a second layer, both of which are configured to transmit a service;
    at least one network node configured to collect charging data on the first layer; and
    a billing domain comprising at least a first layer charging function configured to control charging on the first layer and a second layer charging function configured to control charging on the second layer; the billing domain being configured to transmit, to the first layer charging function, as a first piece of information, information indicating whether or not the first layer charging data are attended to by the second layer charging function in response to the second layer charging function having received a request associated with charging control, the first piece of information not being part of the first layer charging data; wherein
    the first layer charging function is configured to receive the information, to check the information and to interpret it as the first piece of information only if the information indicates that the first layer charging data are attended to by the second layer charging function, and to transmit, in response to the information being the first piece of information, to the network node, information in a first charging instruction indicating that the charging data are not transmitted to the first layer charging function; and
    the network node is configured not to transmit charging data to the first layer charging function in response to the first charging instruction.

13. A network node comprising:
    reception unit configured to receive a first piece of information indicating that first layer charging data are attended to by a second layer, the first piece of information not being part of the first layer charging data; and control unit configured to control first layer charging, to be responsive to the reception unit and to wait a predetermined time for a first piece of information to transmit, in response to receiving the first piece of information during a predetermined time, to a network node collecting charging data in the first layer, in a first charging instruction, information indicating that the charging data are not transmitted to the first layer charging function, and to transmit, in response not to receiving the first piece of information during the predetermined time, to the network node collecting charging data in the first layer, in a second charging instruction, information indicating that the charging data are transmitted to the first layer charging function, wherein the first layer and the second layer are usable for transmitting a service in a telecommunication system.

14. A network node comprising:

a first layer charging function attending first layer charging data;

control unit configured to control first layer charging and, in response to a request associated with controlling of the first layer charging, to transmit a first charging instruction to a network node collecting charging data in the first layer, the first charging instruction indicating that the charging data are transmitted to the first layer charging function; and reception unit configured to receive first layer charging data and a first piece of information indicating that the first layer charging data are attended to by a second layer, the first piece of information not being part of the first layer charging data, wherein the control unit is configured to be responsive to the reception unit and to give an instruction, in response to the reception of the first piece of information, to the first layer charging function to ignore at least partly the charging data received from the network node collecting the charging data, and to transmit a second charging instruction to the network node collecting charging data in the first layer, the second instruction indicating that the charging data are transmitted to the second layer charging function;

the first layer charging function is configured to ignore, in response to the first piece of information, at least partly the charging data coming from network node collecting charging data on the first layer; and the first layer and the second layer are usable for transmitting a service in a telecommunication system.

15. A network node, comprising:

a first layer charging function configured to control charging on a first layer, to transmit to a network node collecting charging data on the first layer a first charging instruction indicating that the charging data are transmitted to the first layer charging function, to receive charging data from the network node, to receive from a billing domain information indicating whether or not the first layer charging data are attended to by a second layer charging function, to check the information and to interpret it as a first piece of information only if the information indicates that the first layer charging data are attended to by the second layer charging function, and to transmit, in response to the information being the first piece of information, to the network node collecting charging data on the first layer, information in a second charging instruction indicating that the charging data are not transmitted to the first layer charging function.

\* \* \* \* \*